United States Patent
Tsang (10) Patent No.: US 10,808,852 B2
(45) Date of Patent: Oct. 20, 2020

(54) CHECK VALVE AND SYSTEM FOR CONTINUOUS SUPPLY OF INK TO PRINTER

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventor: Chi-Yu Tsang, New Taipei (TW)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/423,578

(22) Filed: May 28, 2019

(65) Prior Publication Data

US 2020/0096124 A1    Mar. 26, 2020

(30) Foreign Application Priority Data

Aug. 31, 2018  (CN) .......................... 2018 1 1014181

(51) Int. Cl.
| | |
|---|---|
| *B41J 2/175* | (2006.01) |
| *F16K 15/06* | (2006.01) |
| *F16K 17/08* | (2006.01) |
| *F16K 15/18* | (2006.01) |

(52) U.S. Cl.
CPC .......... *F16K 15/063* (2013.01); *B41J 2/17503* (2013.01); *B41J 2/17596* (2013.01); *F16K 15/185* (2013.01); *F16K 17/082* (2013.01)

(58) Field of Classification Search
CPC . B41J 2/17503; B41J 2/17595; F16K 15/063; F16K 15/14; F16K 15/145; F16K 15/185; F16K 15/188; F16K 17/082
See application file for complete search history.

(56) References Cited

U.S. PATENT DOCUMENTS

| | | | | |
|---|---|---|---|---|
| 5,743,872 | A * | 4/1998 | Kelly | .................... A61M 5/007 137/512 |
| 6,135,580 | A * | 10/2000 | Denning | ............... B60T 13/141 303/117.1 |
| 2004/0032469 | A1 * | 2/2004 | Van Os | ................ B41J 2/17503 347/85 |
| 2015/0114482 | A1 * | 4/2015 | Bishoff | .................. F16K 17/40 137/72 |

* cited by examiner

*Primary Examiner* — Anh T Vo
(74) *Attorney, Agent, or Firm* — ScienBiziP, P.C.

(57) ABSTRACT

A system for continuous supply of ink to a printer includes an ink tank, a supporting seat including several inkjet cartridges, and several check valves. The check valve includes a connecting tube having a first through port and a second through port, and a piston shaft movably installed in the connecting tube. The piston shaft moves to open or close the first through port. The first through port communicates with the ink tank by an ink tube and leakage of ink when the printer is lifted or when an inkhead is changed is prevented.

14 Claims, 10 Drawing Sheets

CHECK VALVE AND SYSTEM FOR CONTINUOUS SUPPLY OF INK TO PRINTER

FIELD

The subject matter herein generally relates to printing and printing ink supply.

BACKGROUND

An external ink tank can supply ink to a printer continuously, a user can refill the ink tank easily and proprietary ink cartridges are not required, cost is reduced.

However, if the printer is not used for a long time, the ink can evaporate and dry up or can back-flow. Furthermore, such ink leaks very easily when the printer is lifted or carried.

Therefore, there is room for improvement within the art.

BRIEF DESCRIPTION OF THE DRAWINGS

Implementations of the present technology will now be described, by way of embodiments, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like.

Figure 1:
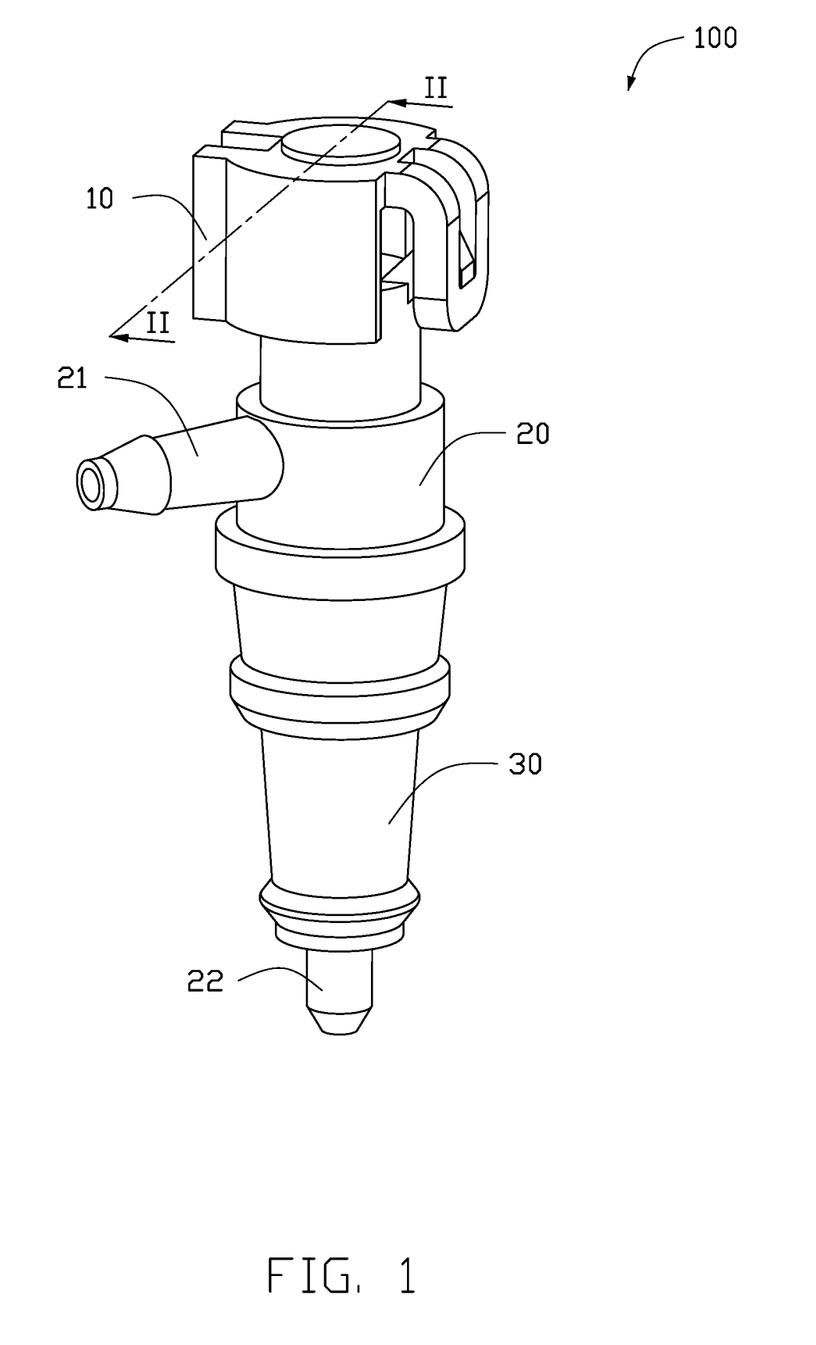
FIG. 1 is a perspective view illustrating the structure of a check valve in a first embodiment, the check valve comprises a piston shaft which can close or open a first through port, and a trigger shaft which can open or close a second through port.

FIG. 1 illustrates the structure of a check valve 100 in a first embodiment. Referring to FIG. 1, the check valve 100 includes a control cover 10, a connecting tube 20, and a rubber casing pipe 30. The control cover 10 is sleeved on one end of the connecting tube 20. The control cover 10 can move along the length of the connecting tube 20.

The connecting tube 20 may be an L-type tube. The connecting tube 20 defines a cavity therein. The connecting tube 20 comprises a first through port 23 and a second through port 24, both being formed on side walls. In the first embodiment, ink is inputted from the first through port 23. The connecting tube 20 includes a flange 21, which protrudes out beyond the rotational surface of the connecting tube 20. The flange 21 is hollow and connected with the first through port 23. The second through port 24 is on one end of the connecting tube 20. Ink is outputted from the second through port 24. The ink flows to the first through port 23 through the flange 21, is injected into the cavity of the connecting tube 20, and is discharged from the second through port 24.

The rubber casing pipe 30 includes a convex plate 31. The end of the connecting tube 20 which is near the second through port 24 is inserted into the rubber casing pipe 30 and is in contact with the convex plate 31.

Figure 2:
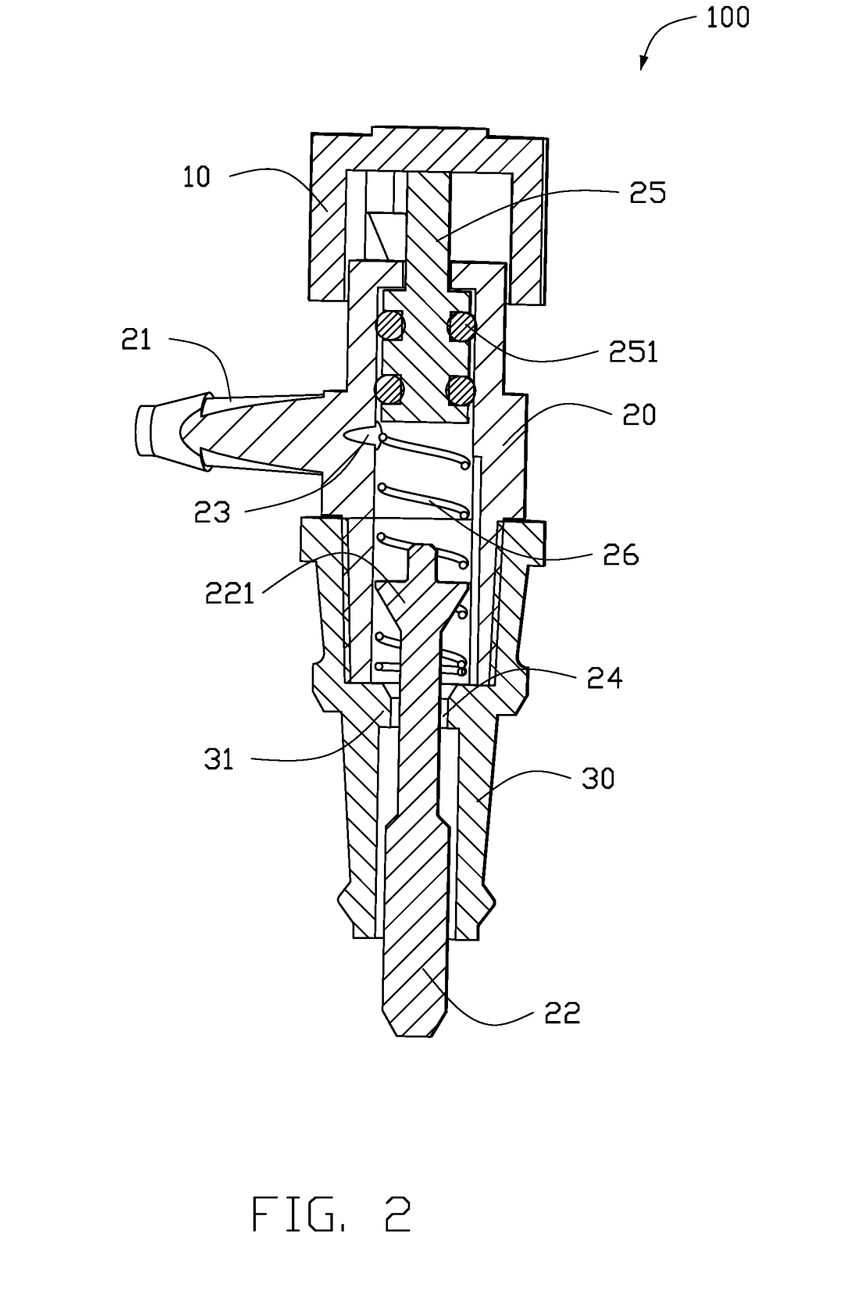
FIG. 2 is a cross-sectional view taken along line II-II of FIG. 1, which shows the piston shaft is in a state of keeping the first through port open.

Referring to FIG. 2, the connecting tube 20 of the check valve 100 includes a piston shaft 25, a first elastic member 26, and a trigger shaft 22.

Figure 3:
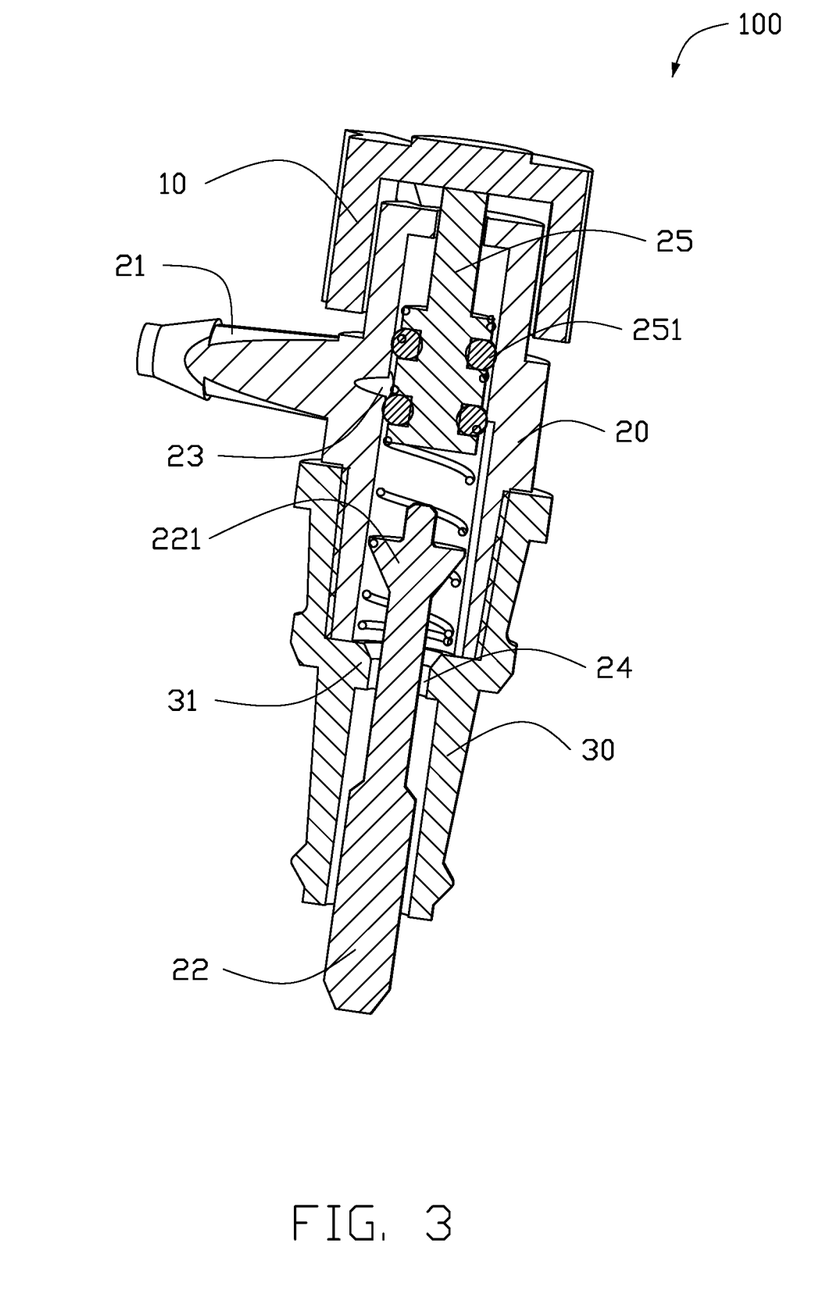
FIG. 3 is a cross-sectional view of the check valve of FIG. 1, which shows the piston shaft is in a state of keeping the first through port closed, while the trigger shaft is in a state of keeping the second through port open.

The piston shaft 25 is substantially a cylinder. The piston shaft 25 is positioned in the connecting tube 20. The piston shaft 25 is able to move along the length direction of the connecting tube 20 to close or open the first through port 23. When the piston shaft 25 closes the first through port 23, ink is prevented from being inputted into the connecting tube 20 from the first through port 23. When the piston shaft 25 opens the first through port 23, the ink flows into the connecting tube 20 through the first through port 23. In the first embodiment, one end of the piston shaft 25 extends out of the connecting tube 20 and contacts the control cover 10. When the control cover 10 is pushed to move along the connecting tube 20, the control cover 10 pushes the piston shaft 25 to move in the connecting tube 20, the first elastic member 26 is pressed until the piston shaft 25 closes the first through port 23. In the first embodiment, there are at least two sealing rings 251 sheathed on the piston shaft 25. There is regular distance between the two sealing rings 251. Referring to FIG. 3, when the piston shaft 25 closes the first through port 23, the first through port 23 is between the two sealing rings 251. Therefore, the ink is not able to pass through the two sealing rings 251 and flow into the two ends of the piston shaft 25 (the top end or the bottom end of the piston shaft 25 is shown in FIG. 3). Thus, ink is effectively sealed between the two sealing rings 251, and the first through port 23 is sealed off. When the control cover 10 is not being pressed, the first elastic member 26 urges the piston shaft 25 and the control cover 10 to move towards the location near the control cover 10. The first through port 23 leaves the sealing ring 251 at the bottom side, so the first through port 23 is open and the ink can flow into the first through port 23 and escape to the control cover 10.

Figure 4:
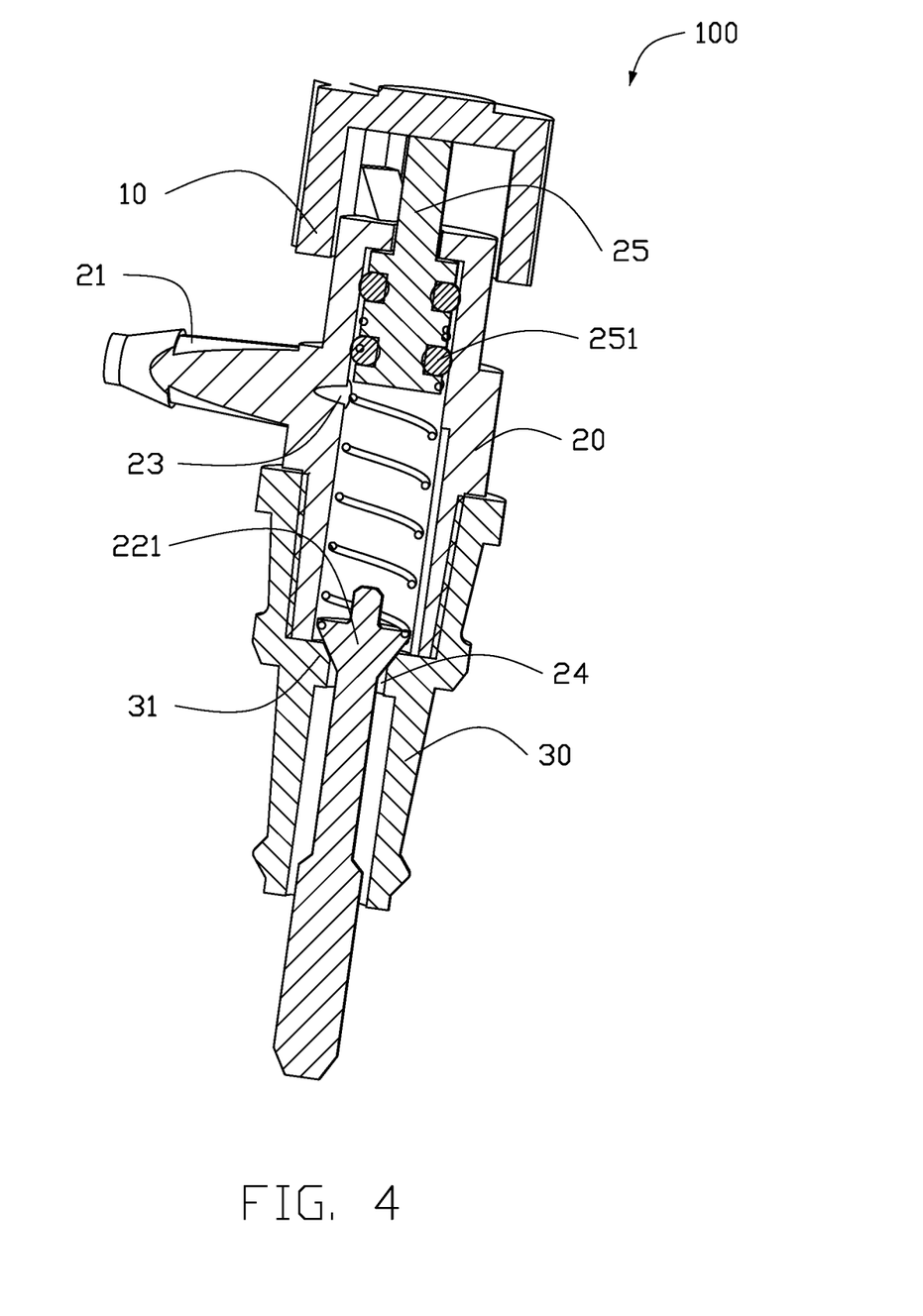
FIG. 4 is a cross-sectional view of the check valve of FIG. 1, which shows the trigger shaft is in a state of keeping the second through port closed.

The trigger shaft 22 is substantially a cylinder. The trigger shaft 22 is positioned in the connecting tube 20. The trigger shaft 22 can move along the length of the connecting tube 20 to close or open the second through port 24. In the first embodiment, the trigger shaft 22 includes a wedge shape bulge 221. The trigger shaft 22 can move to place the bulge 221 against the second through port 24, thus sealing off the port 24. As FIG. 3 shows, there is gap between the bulge 221 and the second through port 24 and the second through port 24 is open. As FIG. 4 shows, the second through port 24 is closed. Referring to FIG. 3 and FIG. 4, when the trigger shaft 22 moves towards the second through port 24, the bulge 221 makes contact with the side wall of the second through port 24 and blocks the second through port 24. In the first embodiment, the end of the trigger shaft 22, which is far away from the piston shaft 25, extends through the second through port 24 and extends out of the other end of the rubber casing pipe 30. When the whole check valve 100 moves downwards, the part of the trigger shaft 22 which is outside of the second through port 24 makes contact with another component. The trigger shaft 22 is thus moved away from the second through port 24 and the second through port 24 is opened.

The first elastic member 26 can be a spring or elastomer made of polymers. The first elastic member 26 has resilience. The first elastic member 26 is set between the piston shaft 25 and the trigger shaft 22. When the piston shaft 25 and the trigger shaft 22 are approaching each other, the first elastic member 26 is being squeezed. In the first embodiment, when not being pressed by an external force, the sealing ring 251 is above the first through port 23 ("the sealing ring 251 is above" refers to the ring 251 in the orientation shown in FIG. 3 and FIG. 4). The first through port 23 is open and the bulge 221 is in contact with the side wall of the second through port 24, the second through port 24 is closed. When the piston shaft 25 is be pressed downwards, the first through port 23 is between the two sealing rings 251 and is closed. When the piston shaft 25 moves upwards again, the bulge 221 leaves the second through port 24 and the second through port 24 is thus opened.

In the first embodiment, when a printer is out of use for a long term or is being carried, the check valve 100 is locked and the piston shaft 25 seals the first through port 23 to avoid backflow of ink or leaking. When the printer is to be used, the piston shaft 25 is moved to unlock the check valve 100 so the ink can pass through the check valve 100. When, for example, a print head needs to be replaced, the check valve 100 is moved to allow the first elastic member 26 to drive the trigger shaft 22 to seal the second through port 24, preventing leakage of ink.

Figure 5:
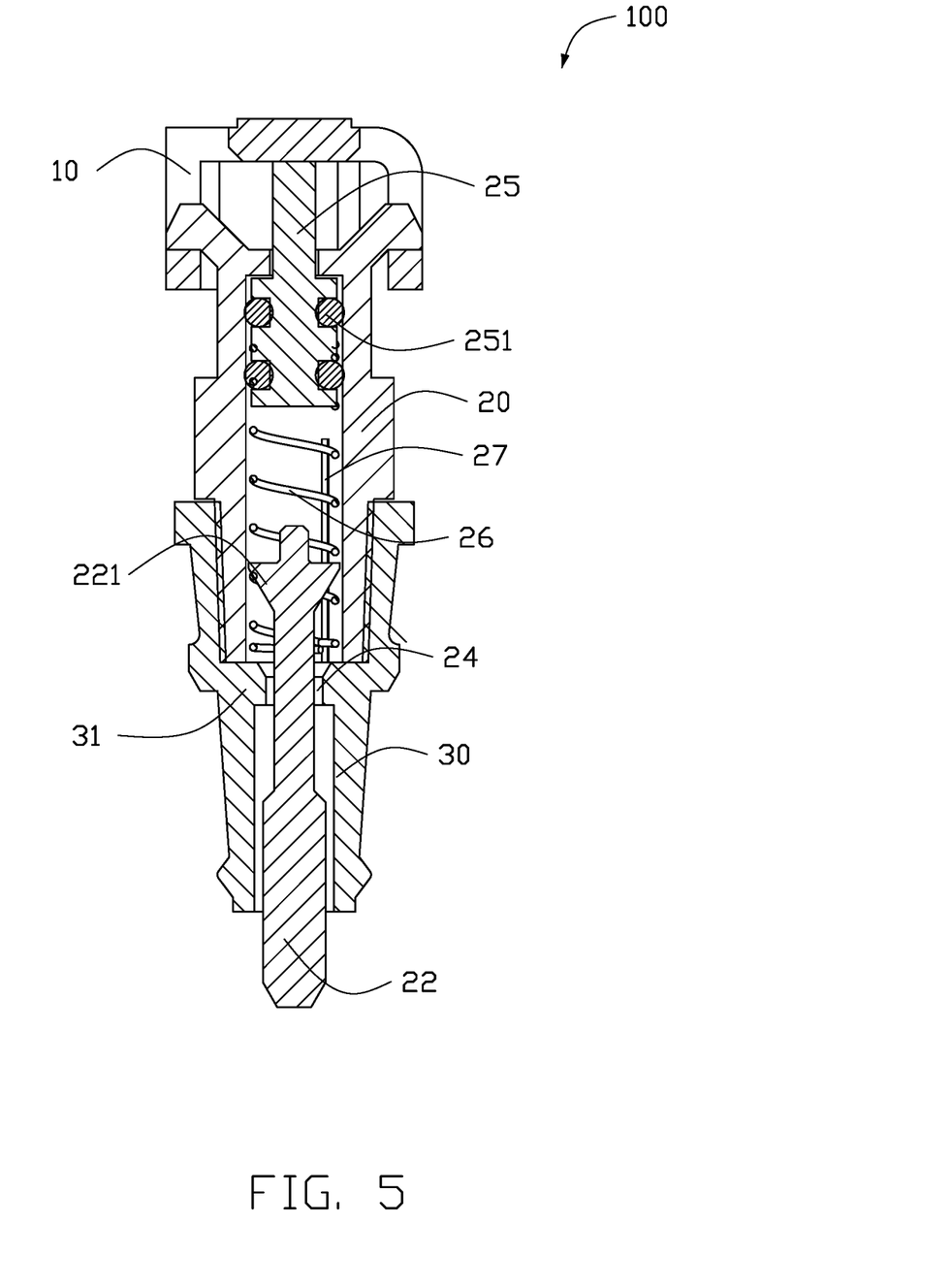
FIG. 5 is a cross-sectional view illustrating the structure of a check valve in a second embodiment.
Figure 6:
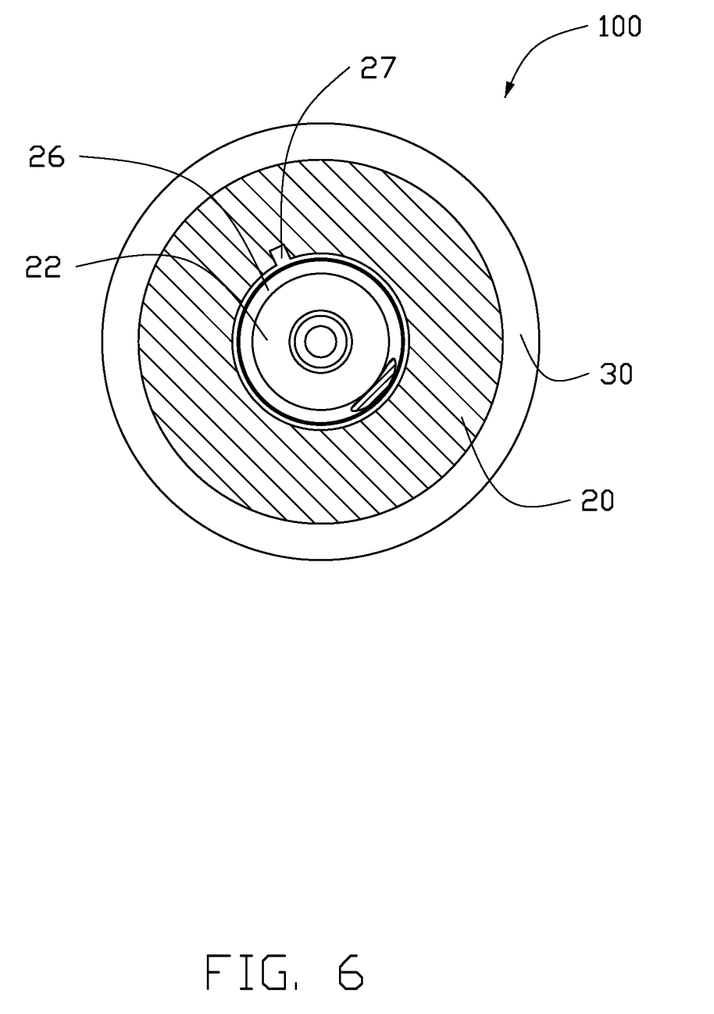
FIG. 6 is a cross-sectional view of the check valve of FIG. 5.

FIGS. 5 and 6 illustrate the structure of the check valve 100 in a second embodiment.

The main difference between the second embodiment and the first embodiment is that the check valve 100 in the second embodiment includes a runner 27.

Referring to FIG. 5 and FIG. 6, one end of the runner 27 is connected to the first through port 23, and the other end of the runner 27 is connected to the second through port 24. Specifically, one end of the runner 27 is near the first through port 23. When the piston shaft 25 closes the first through port 23, the end of the runner 27 is connected to the gap between the piston shaft 25 and the sealing ring 251. This allows the ink in the first through port 23 to flow into the runner 27. The other end of the runner 27 is connected to the second through port 24. When the trigger shaft 22 closes the second through port 24, the ink in the runner 27 can flow out from the second through port 24. In the second embodiment, the runner 27 is a groove defined on the inner side of the connecting tube 20. In other embodiment, the runner 27 can be an additional tube. The runner 27 is a micro-runner. When the first through port 23 is closed by the piston shaft 25, the first through port 23 can still connect with the second through port 24 through the runner 27. Therefore, when for example atmospheric air pressure changes, the internal pressure of the check valve 100 changes according, which avoids leakage of ink.

Figure 7:
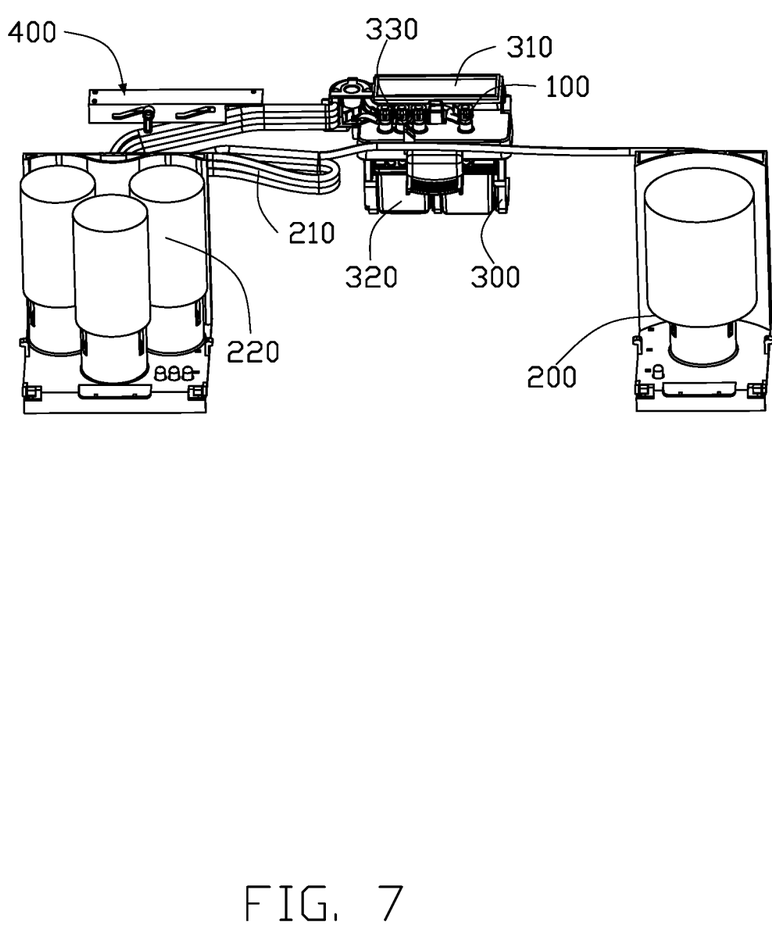
FIG. 7 is a perspective view illustrating the structure of a system for supplying ink in a third embodiment.

FIG. 7 illustrates the structure of a system for continuous supply of ink to a printer in a third embodiment. Referring to FIG. 7, the system includes an ink tank 200 and a supporting seat 300. The ink tank 200 contains the ink for printing. The printer can include one or more ink tanks 200 to contain different types or standards or colors of ink. The ink in the ink tank 200 can flow to the check valve 100 by an ink tube 210, and then flow to an inkjet cartridge 320 for printing.

The supporting seat 300 includes a cover 310, several inkjet cartridges 320, and the check valve 100 mentioned above. The cover 310 covers the supporting seat 300. One side of the cover 310 is hinged on the supporting seat 300. The cover 310 can thus revolve to open or close the supporting seat 300.

Figure 8:
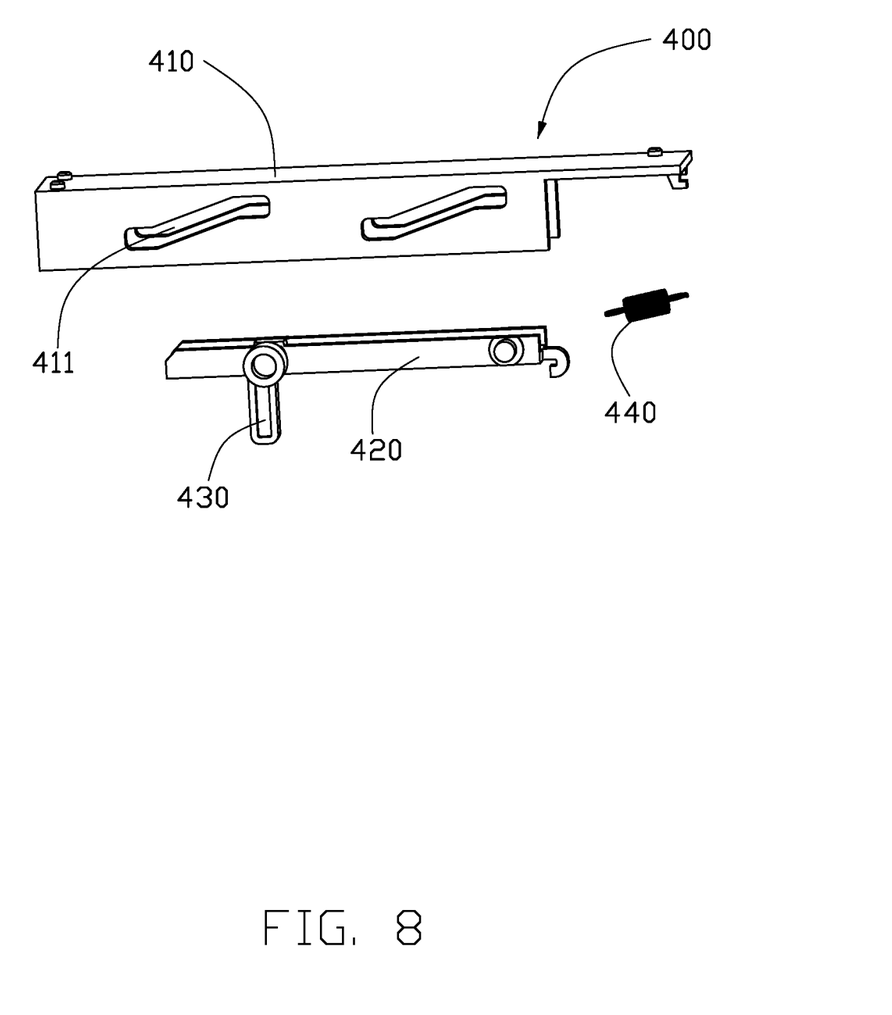
FIG. 8 is a perspective view of the system in FIG. 7.

Referring to FIG. 8, the flange 21 of the connecting tube 20 is connected to the ink tube 210. The other end of the ink tube 210 is connected to the ink tank 200. Therefore, the ink tube 201 connects the first through port 23 to the ink tank 200. The check valve 100 is fixed on the cover 310. An end of the check valve 100 which is near the trigger shaft 22 is inserted into the inkjet cartridge 320. The trigger shaft 22 is in contact with the bottom surface of the inkjet cartridge 320 to open the second through port 24. In use, the cover 310 is closed and the trigger shaft 22 is in contact with the bottom surface of the inkjet cartridge 320 to open the second through port 24. The first elastic member 26 drives the piston shaft 25 to move until the first through port 23 is below the sealing ring 251. Therefore, the first through port 23 is open.

When printing, the negative pressure or vacuum produced by printing pushes the ink from the ink tank 200 to flow to the first through port 23 through the ink tube 210. Then the ink flows passes through the second through port 24 to supplement the inkjet cartridge 320. When the user needs to repair or change the print head, the cover 310 is opened to separate the check valve 100 from the inkjet cartridge 320. Then the trigger shaft 22 is freed. The first elastic member 26 drives the trigger shaft 22 to move closer to the second through port 24 until the bulge 221 seals the second through port 24 and the trigger shaft 22 forms an enclosed space with the rubber casing pipe 30. Ink leakage is thus prevented. When the user needs to carry or move the printer, the control cover 10 is pressed with the piston shaft 25 to move towards the first through port 23, until the first through port 23 is between the two sealing rings 251. The first through port 23 being sealed, ink will not leak.

Figure 9:
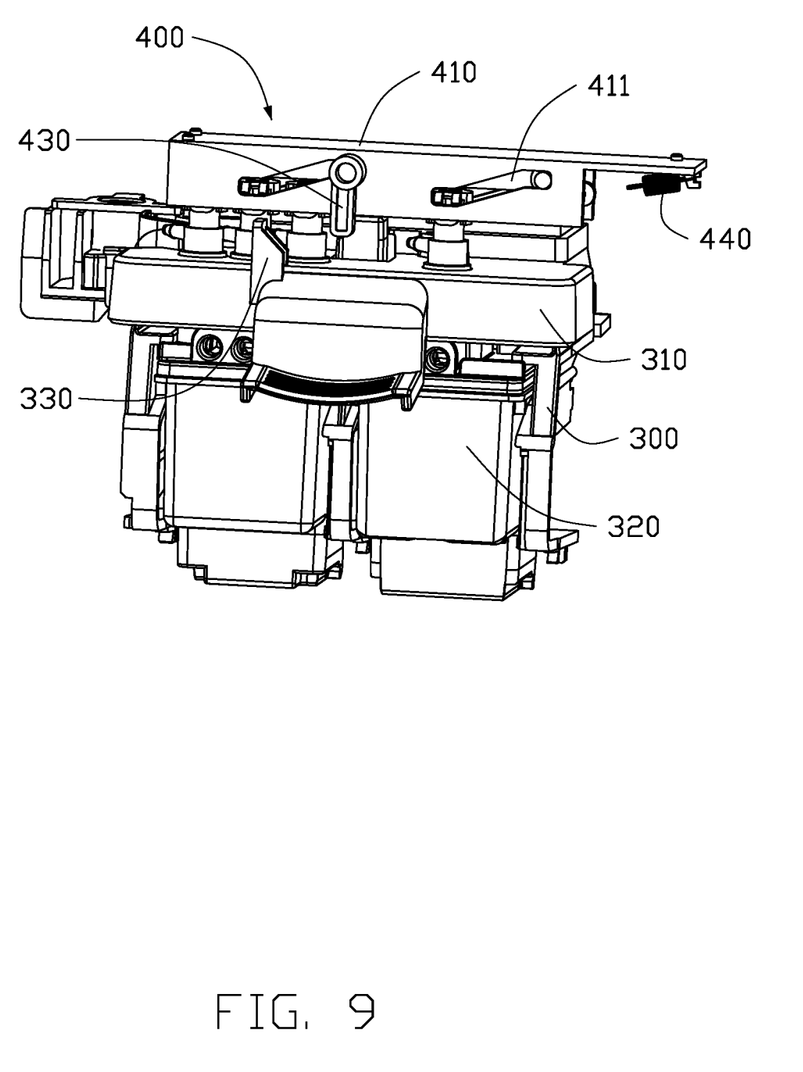
FIG. 9 is a perspective view illustrating the driving assembly of the system in FIG. 7.

In the third embodiment, the system includes a driving assembly 400. Referring to FIG. 9, the driving assembly 400 includes a slide rail 410, a pressing board 420, a connecting rod 430, and a second elastic member 440. In the third embodiment, the slide rail 410 is a C-type plate. The slide rail 410 includes two inclined tracks 411, each installed on a side wall. The sides of the pressing board 420 are movably installed on one track 411. The connecting rod 430 is L-type. One end of the connecting rod 430 is connected with the slide rail 410, the other end extends towards the supporting seat 300. One end of the second elastic member 440 is connected with the slide rail 410, the other end of the second elastic member 440 is connected with the pressing board 420. When the pressing board 420 is moved along the slide rail 410, the second elastic member 440 is deformed. Depending on the position of the pressing board 420, the deformation can be produced by stretching or compressing.

Figure 10:
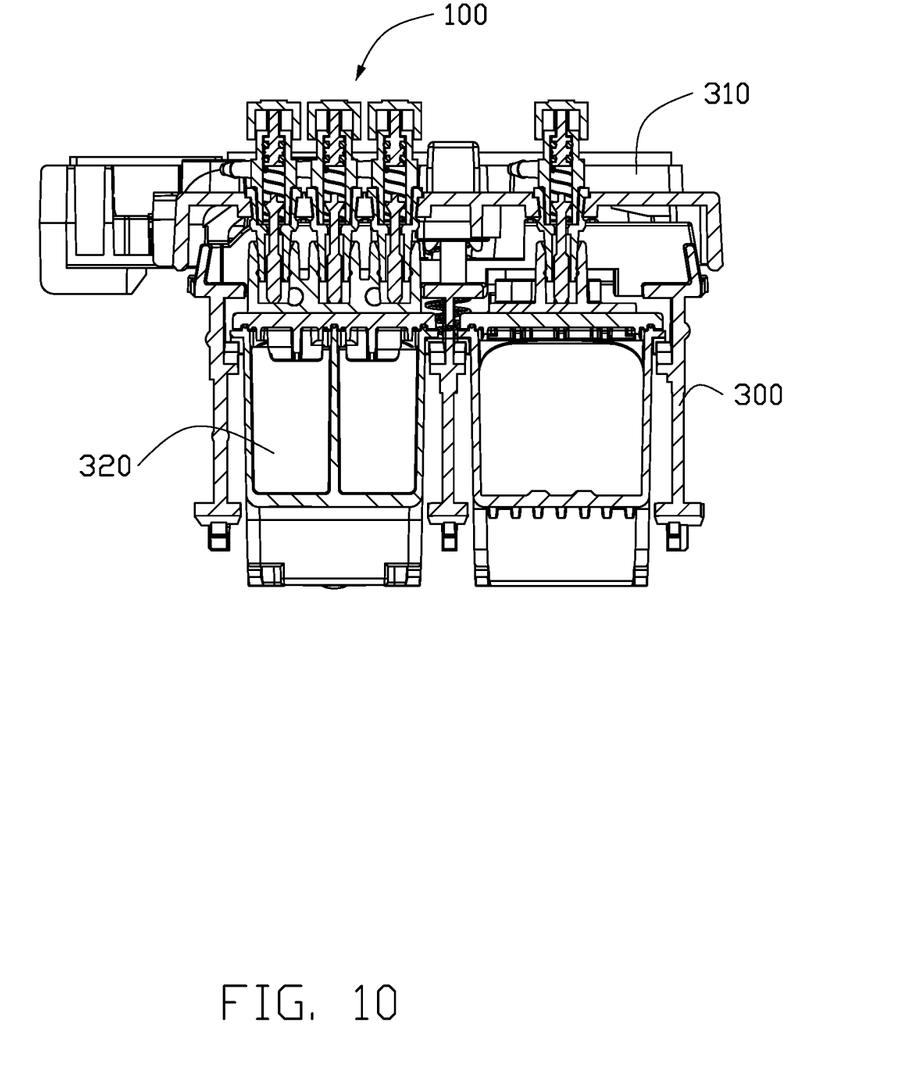
FIG. 10 is a cross-sectional view of the structure of FIG. 7, which shows the system is at a state that the driving assembly squeezes the piston shaft.

Referring FIG. 10, the supporting seat 300 can move closer to or away from the driving assembly 400. The cover 310 includes a trigger block 330. When the supporting seat 300 moves towards the driving assembly 400, the trigger block 330 of the supporting seat 300 makes contact with the connecting rod 430 and drives the connecting rod 430 to move along the slide rail 410. The connecting rod 430 drives the pressing board 420 to move along the slide rail 410 and stretches the second elastic member 440. When moving along the slide rail 410, the pressing board 420 is closer to the control cover 10 of the check valve 100 on the supporting seat 300 and presses the control cover 10. Pressed by the pressing board 420, the control cover 10 drives the piston shaft 25 to move towards the first through port 23 and seal the first through port 23.

In the third embodiment, when the supporting seat 300 recovers, the supporting seat 300 is below the driving assembly 400. At this position, the pressing board 420 presses the control cover 10 to make the piston shaft 25 seal the first through port 23. When the supporting seat 300 moves away from the driving assembly 400, the control cover 10 is freed. The first elastic member 26 pushes the piston shaft 25 and the control cover 10 to move away from the first through port 23 and the first through port 23 is opened. The second elastic member 440 drives the pressing board 420 to move back along the slide rail 410 to avoid the pressing board 420 being jammed without external force.

The embodiments shown and described above are only examples. Many such details are found in the relevant art. Therefore, such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A check valve comprising:
    a connecting tube comprising a first through port and a second through port, the first through port being configured for ink flowing into the connecting tube, the second through port being configured for ink flowing out of the connecting tube;
    a piston shaft movably installed in the connecting tube, the piston shaft being capable of moving to open the first through port or to close the first through port;
    at least two sealing rings installed on the piston shaft, when the piston shaft moves to place the first through port between the at least two sealing rings, the first through port is closed;
    a trigger shaft installed in the connecting tube; and
    a first elastic member contacting with the piston shaft and one end of the trigger shaft, the other end of the trigger shaft extending out of the second through port;
    when the trigger shaft is externally driven to move away from the second through port, the second through port is opened; when the external driving is withdrawn, the first elastic member drives the trigger shaft to move towards the second through port and so seal the second through port.

2. The check valve of claim 1, wherein the check valve further comprises a control cover, the control cover is sheathed on one end of the connecting tube, one end of the piston shaft extends out of the end of the connecting tube and contacts with the control cover, the other end of the piston shaft contacts with the first elastic member; the control cover is pushed by external force to drive the piston shaft to close the first through port and deforms the first elastic member, when the external force is withdrawn, the first elastic member drives the piston shaft and the control cover to move to open the first through port.

3. The check valve of claim 1, wherein the trigger shaft further comprises a wedge shape bulge, the trigger shaft moves to make the bulge contact the second through port so as to close the second through port.

4. The check valve of claim 3, wherein the check valve further comprises a rubber casing pipe, the rubber casing pipe comprises a convex plate, the end of the connecting tube near the second through port is contacts with the bulge.

5. The check valve of claim 1, wherein the check valve further comprises a runner, one end of the runner is communicated with the first through port, the other end of the runner is communicated with the second through port; when the piston shaft closed the first through port, the runner communicates the first through port with the second through port.

6. A system for continuous supply of ink to printer, comprising:
    an ink tank;
    a supporting seat comprising several inkjet cartridges; and
    several check valves installed on the several inkjet cartridges, the check valve comprising:
    a connecting tube comprising a first through port and a second through port, the first through port being connected to the ink tank by an ink tube, the second through port being configured for ink flowing out of connecting tube;
    a piston shaft movably installed in the connecting tube, the piston shaft being capable of moving to open the first through port or to close the first through port;
    a trigger shaft installed in the connecting tube; and
    a first elastic member contacting the piston shaft and one end of the trigger shaft, the other end of the trigger shaft extending out of the second through port;
    when the trigger shaft is externally driven to move away from the second through port, the second through port is opened and the first elastic member deforms; when the external driving is withdrawn, the first elastic member drives the trigger shaft to move towards the second through port and so seal the second through port, when the trigger shaft contacts the inkjet cartridge, the trigger shaft is driven to open the second through port.

7. The system of claim 6, wherein the system further comprises a cover, the check valve is fixed on the cover.

8. The system of claim 7, wherein the system further comprises a driving assembly, the driving assembly comprising a slide rail, a pressing board, and a connecting rod, the pressing board is connected to the slide rail, the connecting rod is connected to the pressing board, when the supporting seat moves towards the driving assembly, the supporting seat contacts with the connecting rod, the connecting rod drives the pressing board to move along the slide rail to press the piston shaft to seal the first through port.

9. The system of claim 8, wherein the system further comprises a second elastic member, two ends of the second elastic member are connected to the pressing board and the slide rail respectively, when the supporting seat moves towards the driving assembly, the connecting rod drives the pressing board to move along the slide rail and the second elastic member deforms;

when the supporting seat moves away from the driving assembly, the second elastic member drives the pressing board to move back.

10. The system of claim 9, wherein the check valve further comprises at least two sealing rings sheathed on the piston shaft, the piston shaft moves to make the first through port between the at least two sealing rings and being closed.

11. The system of claim 10, wherein the check valve further comprises a control cover, the control cover is sheathed on one end of the connecting tube, one end of the piston shaft extends out of the end of the connecting tube and contacts with the control cover, the other end of the piston shaft contacts with the first elastic member; the control cover is pushed by external force to drive the piston shaft to close the first through port and the first elastic member deforms, when the external force is withdrawn, the first elastic member drives the piston shaft and the control cover to move to open the first through port.

12. The system of claim 10, wherein the trigger shaft further comprises a wedge shape bulge, the trigger shaft moves to make the bulge contacts with the second through port to close the second through port.

13. The system of claim 12, wherein the check valve further comprises a rubber casing pipe, the rubber casing pipe includes a convex plate, an end of the connecting tube near the second through port is contacts with the bulge.

14. The system of claim 6, wherein the check valve further comprises a runner, one end of the runner is communicated with the first through port, the other end of the runner is communicated with the second through port; when the piston shaft closes the first through port, the runner communicates the first through port with the second through port.

\* \* \* \* \*